United States Patent [19]

Noguchi et al.

[11] 4,084,551
[45] * Apr. 18, 1978

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[*] Notice: The portion of the term of this patent subsequent to Aug. 17, 1993, has been disclaimed.

[21] Appl. No.: 610,889

[22] Filed: Sep. 5, 1975

Related U.S. Application Data

[63] Continuation-in-part of Ser. No. 434,216, Jan. 17, 1974, Pat. No. 3,974,818.

[30] Foreign Application Priority Data

| Jan. 22, 1973 | Japan | 48-9748 |
| Feb. 27, 1973 | Japan | 48-23919 |
| Mar. 8, 1973 | Japan | 48-27277 |
| Apr. 3, 1977 | Japan | 52-38467 |
| Oct. 31, 1973 | Japan | 48-123227 |
| Jan. 10, 1975 | Japan | 50-5750 |

[51] Int. Cl.² .................. F02B 19/10; F02B 19/16
[52] U.S. Cl. .................. 123/32 SP; 123/75 B; 123/32 L; 123/32 C
[58] Field of Search ........... 123/32 ST, 32 SP, 75 B, 123/191 S, 191 SP

[56] References Cited

U.S. PATENT DOCUMENTS

| 2,763,248 | 9/1956 | Green et al. | 123/32 SP |
| 2,799,257 | 7/1957 | Stumpfig | 123/32 SP |
| 3,213,839 | 10/1965 | Gitlin | 123/75 B |
| 3,230,939 | 1/1966 | Goossak | 123/32 SP |
| 3,270,721 | 9/1966 | Hideg | 123/32 ST |
| 3,283,751 | 11/1966 | Goossak | 123/32 SP |
| 3,853,097 | 12/1974 | Kume | 123/32 SP |
| 3,930,471 | 1/1976 | Leonard | 123/32 SP |
| 3,974,818 | 8/1976 | Noguchi et al. | 123/32 SP |

Primary Examiner—Ronald B. Cox
Attorney, Agent, or Firm—Cushman, Darby & Cushman

[57] ABSTRACT

A torch ignition type internal combustion engine has a trap chamber comprising a cup-shaped member of a heat-resistant metal mounted on a cylinder head of the engine. The member has a substantially closed end protruding into a main combustion chamber and suction and discharge apertures through which the trap chamber always communicates with the main combustion chamber. A single intake port is provided in the cylinder head for supplying air-fuel mixture charges to both the main combustion chamber and trap chamber. The suction aperture is positioned adjacent to the back face of the valve head when it is in the open position so that a part of the air-fuel mixture from the single intake port flowing over the back face of the valve head is introduced through the suction aperture into the trap chamber on the intake stroke and ignited on the combustion stroke by a spark plug to provide torch jets which run through the suction and discharge apertures into the main combustion chamber, whereby a torch-ignition of the air-fuel mixture in the main combustion chamber is achieved by a simplified engine construction.

20 Claims, 11 Drawing Figures

INTERNAL COMBUSTION ENGINE

CROSS REFERENCE TO RELATED APPLICATION

This application is a continuation-in-part of our earlier copending application Ser. No. 434,216 filed Jan. 17, 1974, now U.S. Pat. No. 3,974,818, granted Aug. 17, 1976.

BACKGROUND OF THE INVENTION

1. Field of the Invention

The present invention relates to an internal combustion engine intended to reduce the harmful components of exhaust gases by a simplified engine construction and, more particularly, to an improvement in a so-called "torch ignition type internal combustion engine" in which a lean air-fuel mixture in a main combustion chamber is ignited by a torch produced by the ignition of an air-fuel mixture charge in a trap chamber.

2. DESCRIPTION OF THE PRIOR ART

To operate an internal combustion engine with a lean air-fuel mixture is effective to reduce the harmful components of exhaust gases of the engine.

With the conventional internal combustion engine, however, a misfire takes place when the air-fuel mixture charge is as lean as an air-fuel ratio of about 17. Thus, in order to obtain stable combustion of a lean air-fuel mixture in an internal combustion engine, it is necessary to provide the combustion chamber of the engine with some measures.

A torch ignition type internal combustion engine, as is known, has a small combustion chamber and a trap chamber which is in communication therewith by a torch aperture or apertures and in which electrodes of a spark plug are disposeed. The trap chamber is adapted to be supplied with a rich air-fuel mixture which is ignitable by a spark discharge of the spark plug to produce a torch which in turn reliably ignites a lean air-fuel mixture in the main combustion chamber. The known torch ignition type internal combustion engine, however, needs at least two, independent fuel supply circuits, one for supplying the lean air-fuel mixture to the main combustion chamber and the other for supplying the rich air-fuel mixture to the trap chamber. Thus, the fuel supply system of the known engine is complicated in construction compared with an ordinary internal combustion engine.

SUMMARY OF THE INVENTION

The present invention aims to accomplish reliable and stable combustion of a lean air-fuel mixture in a torch ignition type internal combustion engine with a simplified construction for thereby reducing the harmful components of exhaust gases.

The present invention also aims to provide a torch ignition type internal combustion engine which is practically useful and which is operable with a lean air-fuel mixture.

The present invention further aims to facilitate an effective scavenging of a trap chamber for thereby improving the efficiency of the reduction of the harmful components of the exhaust gases.

The internal combustion according to the present invention is basically of a torch ignition type and, thus, has a main combustion chamber which is always in communication with a trap chamber through torch apertures. The present invention, however, is not specially intended to supply a rich air-fuel mixture to the trap chamber but designed to facilitate an effective scavenging of the trap chamber for thereby assuring a reliable introduction of a fresh air-fuel mixture charge into the trap chamber so that the fresh charge is surely ignited in the trap chamber to assure a reliable torch ignition of the lean air-fuel mixture in the main combustion chamber.

The internal combustion engine according to the present invention is provided with only a single intake port per each cylinder to supply an air-fuel mixture to both of the main combustion chamber and the trap chamber. This greatly contributes to the simplification of the engine construction.

In order that the effective scavenging of the trap chamber may be attained, the trap chamber according to the present invention is provided with at least two apertures one of which is a suction aperture for the introduction of a fresh air-fuel mixture charge into the trap chamber during an intake stroke and the other of which is a discharge aperture for the discharge of residual gases therefrom during the same intake stroke. So as to assure a reliable supply of the fresh air-fuel mixture charge to the trap chamber, the suction aperture is located adjacent to the valve head of an intake valve disposed in the intake port and is positioned on the path of the flow of a part of the air-fuel mixture passing over the outer peripheral edge of the valve head when it is in the open position.

While suction and discharge apertures are operative to introduce the fresh air-fuel mixture charge into the trap chamber and discharge the residual gases therefrom during the intake stroke, respectively, these apertures act during combustion stroke as torch apertures through which torch jets spurt from the trap chamber into the main combustion chamber to ignite the air-fuel mixture therein. Thus, the suction and discharge apertures have diameters which are determined to be relatively small enough to achieve the torch effect.

The trap chamber is exposed to a high temperature because fires are successively produced therein. With this in mind, the present invention is characterized by a cup-shaped member of a heat-resistant metal which defines the trap chamber therein and which is manufactured separately of the cylinder head and secured thereto. Preferably, the cup-shaped member may be made from, for example, a heat-resistant stainless steel and tightly screwed or pressure-fitted into the cylinder head.

In addition to the above, the present invention proposes an improvement to more reliably facilitate the scavenging of the trap chamber and an improvement to enable a more lean air-fuel mixture to be ignited. One of the improvements comprises a partition provided in the trap chamber to divide the part of the trap chamber adjacent to the main combustion chamber into two sub-chambers one of which is in direct communication with the suction aperture and the other of which is with the discharge aperture. The partition guides a fresh air-fuel mixture charge from the suction aperture to substantially every place within the trap chamber and finally to the discharge aperture so that a surplus part of the fresh mixture charge is discharged through the discharge aperture, whereby any "short-circuit" of the fresh mixture charge from the suction aperture directly to the discharge aperture is surely avoided to facilitate a substantially complete scavenging of the trap chamber.

The other improvement comprises a proper orientation of the suction and discharge apertures so that a charge of the air-fuel mixture from the intake port reaches substantially every point in the trap chamber.

The invention proposes a further improvement which comprises a feature that an intake port, which forms an air-fuel mixture supply circuit, has a curved portion and a suction aperture for a trap chamber is positioned substantially on a downstream extension of that part of the inner peripheral wall of the intake port which is located on the radially outer side of the curved portion thereof. The air-fuel mixture flowing through the curved intake port is subjected to centrifugal force and, thus, substantially divided into rich and lean air-fuel mixture parts. The rich air-fuel mixture part naturally flows along the radially outer side of the inner peripheral wall of the curved intake port and, thus, through the suction aperture into the trap chamber.

DESCRIPTION OF PREFERRED EMBODIMENTS

Figure 1:
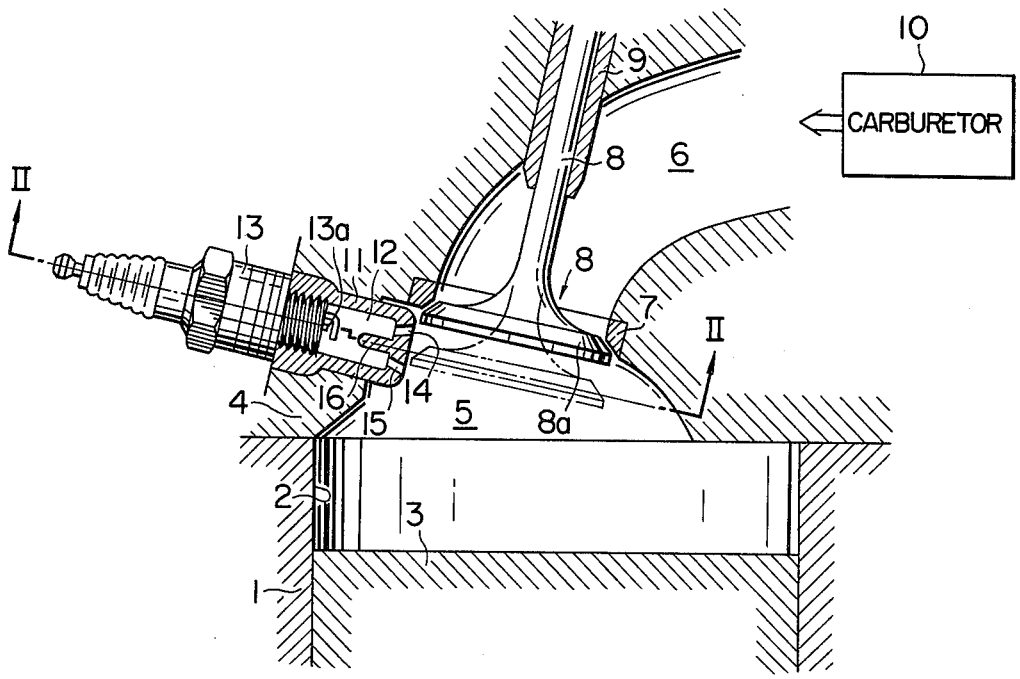
FIG. 1 is a partially diagrammatic, fragmentary sectional elevation of a first embodiment of the internal combustion engine according to the present invention taken along line I — I in FIG. 2.
Figure 2:
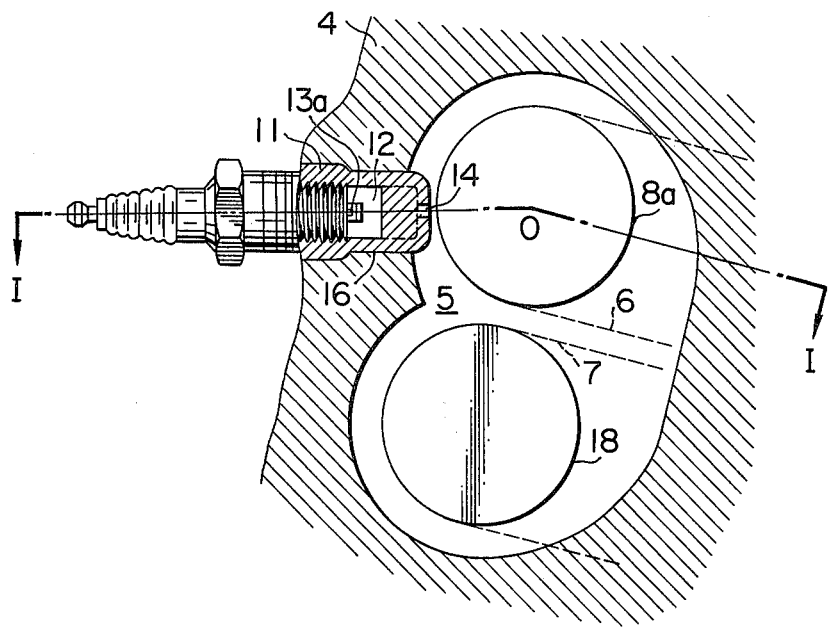
FIG. 2 is a fragmentary sectional view taken along line II — II in FIG. 1.

Referring first to FIGS. 1 and 2, the internal combustion engine according to a first embodiment of the present invention has a cylinder block 1 formed therein with cylinder bores 2, only one of which is shown. A piston 3 is reciprocally housed in each cylinder 1 and operatively connected to a crank shaft (not shown) by a connecting rod (not shown). A cylinder head 4 is mounted on the top of the cylinder block 1 and has a recess which is formed in the bottom face of the cylinder head and which cooperates with the inner peripheral wall of the cylinder bore 2 and the top face of the piston 3 to define a main combustion chamber 5.

The cylinder head 4 is formed therein with an intake port 6 which is curved downwardly and has a downstream end at which the intake port is open to the main combustion chamber 5. A valve seat 7 is secured to the cylinder head at the downstream end of the intake port 6. An intake valve 8 is provided to open and close the intake port 6. The valve 8 has a valve head 8a and a stem 8b, the valve head 8a being cooperative with the valve seat 7 to open and close the intake port 6 as discussed. The stem 8b of the valve 8 slidably extends through a valve guide 9 secured to the cylinder head 4. As is wellknown in the art, the operation of the valve 8 is synchronized with the reciprocal motion of the piston 3 to open and close the intake port 6.

The intake port 6 is communicated with a carburetor 10 through an intake manifold (not shown). The carburetor 10 may be of a conventional type which supplies an air-fuel mixture to the intake manifold. Thus, the carburetor 10 will not be described herein in further detail. The air-fuel mixture used in the embodiment is a lean air-fuel mixture of an air-fuel ratio of approximately 18.

A cup-shaped member 11 is mounted on the cylinder head 4 adjacent to the radially outer side of the curved intake port 6 and positioned adjacent to the head 8a of the intake valve 8. The cup-shaped member 11 is press-fitted to the cylinder head 4 so that the bottom end portion of the member 11 extends a distance into the main combustion chamber 5. The cup-shaped member 11 is disposed such that a part of the outer peripheral edge of the valve head 8a when it is in its open position shown by broken lines is positioned substantially close to the center of the flat bottom of the cup-shaped member 11. The cup-shaped member 11 is prepared separately of the cylinder head 4 and made of a heat-resistant stainless steel, such as those identified by SUS 304, SUS 310, SUS 430 and SUS 631 (classification by "JIS" (Japanese Industrial Standard)). The cup-shaped member 11 defines therein a trap chamber 12.

A spark plug 13 is screwed into the other, open end of the cup-shaped member 11 to close the open end and has a set of electrodes 13a disposed in the open end of the trap chamber 12 remote from the main combustion chamber 5.

Suction and discharge apertures 14 and 15 are formed in the inner part of the cup-shaped member 11 projecting into the main combustion chamber 5. The apertures 14 and 15 extend through the wall of the cup-shaped member 11 and are open to the trap chamber 12 at their one ends and to the main combustion chamber at their other ends. The suction aperture 14 is so disposed as to be adjacent to the back face of the valve head 8a when in its open position (shown by broken lines). Thus, when the valve 8 is opened, the trap chamber 12 is communicated through the suction aperture 14 with the intake port 6 so that the trap chamber receives that part of the air-fuel mixture which flows along that portion of the inner peripheral wall of the intake port 6 which extends along the radially outer side of the curved intake port.

A partition 16 is formed on the inner wall of the cup-shaped member 11 to divide the inner part of the trap chamber 12, i.e., the part of the trap chamber 12 adjacent to the main combustion chamber 5, into two zones or sub-chambers. The partition 16 has one end connected to the flat wall of the cup-shaped member 11 between the suction and discharge apertures 14 and 15 and extends in the trap chamber 12 axially of the cup-shaped member 11, the other end of the partition being directed toward the electrodes 13a. The partition 16 is also connected at its sides to the peripheral wall of the cup-shaped member 11. The partition 16 divides the part of the trap member 12 into two sub-chambers one of which is in direct communication with the suction aperture 14 and the other of which is with the discharge aperture 15. In the illustrated embodiment of the invention, the partition 16 is integral with the cup-shaped member 11, which is manufactured by casting together with the partition 16 as a unit.

As will be seen in FIG. 2, an exhaust port 17 is formed in the cylinder head 4 and adapted to be communicated with the main combustion chamber 5 by an exhaust valve 18.

The operation of the engine having the above-described consutruction will be discussed hereunder. On an intake stroke, the intake valve 8 is opened as shown by the broken lines in FIG. 1 so that the intake port 6 is communicated with the main combustion chamber 5 and with the trap chamber 12 through the suction aperture 14. As the piston is moved downwardly, the air-fuel mixture from the carburetor 10 is supplied through the intake port 6 partly directly into the main combustion chamber 5 and partly through the suction aperture 14 into the trap chamber 12. More particularly, when the air-fuel mixture flows over the head 8a of the intake valve 8 into the main combustion chamber 5, the flow of the mixture is spread radially outwardly of the valve head 8a due to the action of the back face thereof; more particularly, the flow of the mixture is directed radially outwardly of the valve head 8a and obliquely downwardly toward the main combustion chamber 5. The suction aperture 14 for the trap chamber 12 is positioned on the path of the flow of a part of the air-fuel mixture and extends in the same direction as that of the flow of this part of the mixture. Thus, this part of the air-fuel mixture flows at a high velocity through the suction aperture 14 into the trap chamber 12.

As the air-fuel mixture flows into the trap chamber 12, the residual gases therein are discharged and exhausted out of the trap chamber 12 through the discharge aperture 15 on the downward movement of the piston 3, with the result that the trap chamber 12 is filled with a fresh air-fuel mixture charge only. It is also to be noted that, because the trap chamber 12 is a chamber in which charges of air-fuel mixture are successively ignited, the trap chamber 12 is held at a temperature sufficiently high to pre-heat the fresh air-fuel charge.

The partition 16 guides the flow of the fresh air-fuel mixture charge in the trap chamber 12 from the suction aperture 14 to the part of the trap chamber in which the electrodes 13a of the spark plug 13 are disposed. Thus, the fresh air-fuel mixture charge flows from the sub-chamber adjacent to the suction aperture 14 to the outer part of the trap chamber and, then, to the other sub-chamber in the trap chamber 12 adjacent to the discharge aperture 15. Accordingly, the fresh air-fuel mixture charge is fed to substantially all of the places of the trap chamber 12. The partition 16 is effectively operative to prevent any direct, short-circuit or through-flow of the fresh air-fuel mixture charge from the suction aperture 14 to the discharge aperture 15, so that substantially all the residual gases or combustion products in the trap chamber 12 are discharged therefrom through the discharge aperture 15. Thus, it will be appreciated that the partition 16 is operative to assure a reliable scanvenging of the trap chamber 12.

When the engine operation proceeds to a compression stroke, the intake valve 8 is closed. As the piston 3 is moved upwardly, the air-fuel mixture in the main combustion chamber is compressed with the result that a part of the air-fuel mixture being compressed enters the trap chamber 12 through the suction and discharge apertures 14 and 15 to compress the air-fuel mixture in the trap chamber 12. Then a high voltage is applied to the spark plug 13 at a properly controlled timing to cause the plug to produce a spark discharge. As the air-fuel mixture present at this time in the trap chamber 12 is almost a fresh air-fuel mixture charge and this air-fuel mixture charge is pre-heated to a high temperature, the mixture charge in the trap chamber is ignited without fail by the spark discharge produced by the spark plug 13 notwithstanding the fact that the mixture charge supplied is relatively lean. The ignited air-fuel mixture charge surely produces a flame which spurts as torch jets from the trap chamber 12 through the suction and discharge apertures 14 and 15 into the main combustion chamber 5 to ignite the lean air-fuel mixture in the main combustion chamber whereby a perfect combustion of the mixture in the main combustion chamber is attained. It is to be understood that the suction and discharge apertures 14 and 15 have sizes determined to provide optimum torch effect. The compression stroke is thus finished and followed by an exhaust stroke in which the exhaust valve 18 is opened to allow the exhaust gases produced by the combustion to be discharged into the exhaust port 17.

The perfect combustion of the air-fuel mixture facilitates the reduction of harmful gaseous components of the exhaust gases, such as nitrogen oxides ($NO_x$), carbon monooxide (CO) and hydrocarbon (HC). In addition, the combustion of the air-fuel mixture in the main combustion chamber 5 proceeds at a higher speed due to the ignition of the mixture by the torch jets compared with the conventional combustion by a spark ignition. Thus, the ignition timing of the spark plug 13 may correspondingly be retarded, which contributes to a further reduction of nitrogen oxides ($NO_x$).

Figure 3:
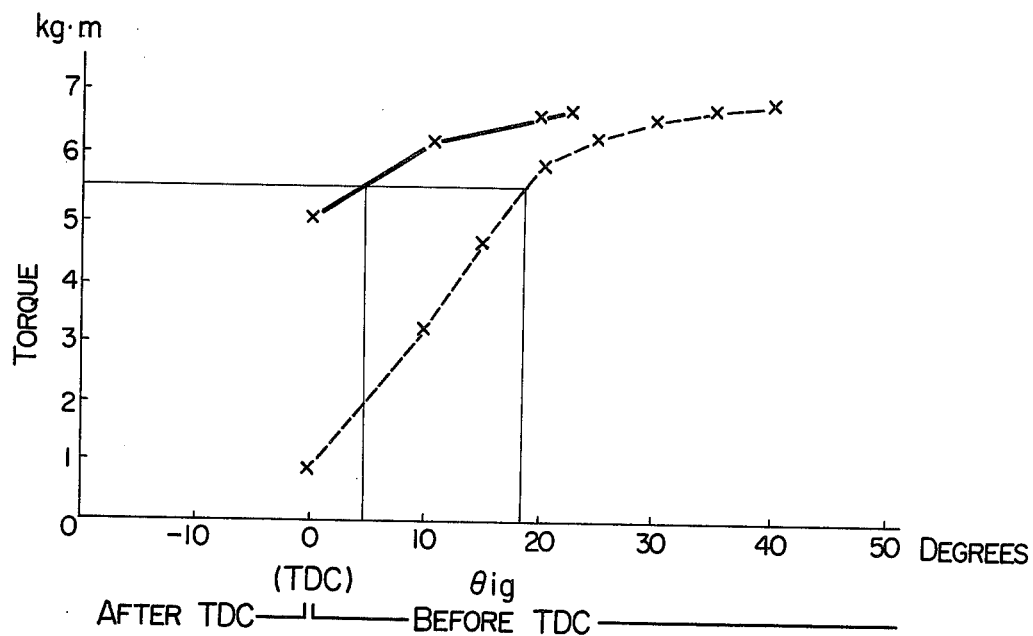
FIG. 3 is a graphical illustration of the relationship of the torque to the ignition timing measured on the internal combustion engine of the first embodiment of the invention.
Figure 4:
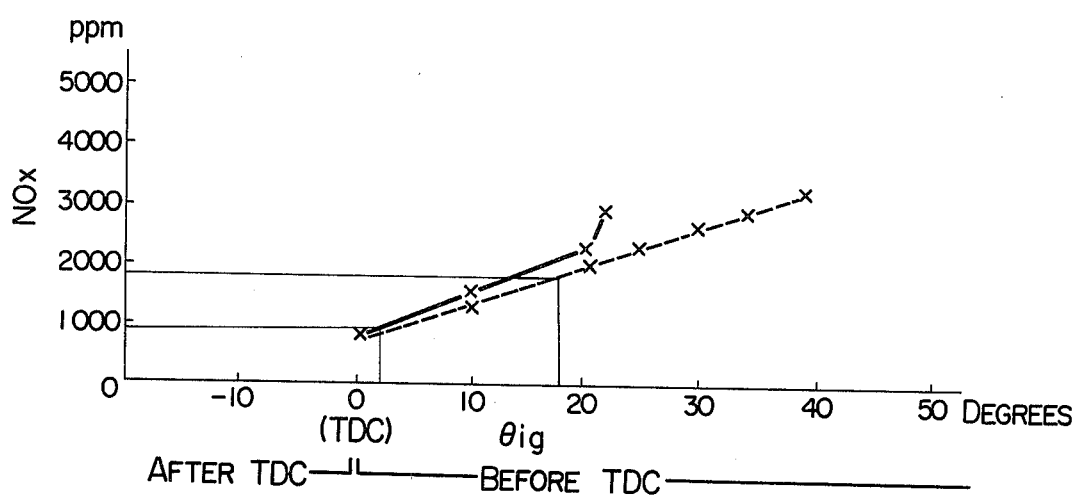
FIG. 4 is a graphical illustration of the relationship of the nitrogen oxide emission to the ignition timing measured on the engine.

These meritorious effects and advantages have been confirmed by tests the results of which are graphically shown in FIGS. 3 and 4 in which the abscissas represent the ignition timing, $\theta ig$, (more exactly, advanced degrees of ignition timing; "O" represents T.D.C. (Top Dead Center), the positive values indicate degrees before T.D.C. and the negative values indicate degrees after T.D.C.). The ordinates in FIGS. 3 and 4 represent the torque (kg.m) and the amount of $NO_x$(ppm), respectively. The curves shown by solid lines illustrate the test values measured on the torch ignition type internal combustion engine according to the described embodiment of the present invention, while the curves shown by broken lines illustrate the test values measured on a conventional internal combustion engine which is not intended to reduce the harmful gaseous components of exhaust gases. In the tests, the internal combustion engines were operated at 2,000 rpm with the intake manifold pressure of 520 mmHg (absolute value) and with the air-fuel mixtures of air-fuel ratio of 18. It will be seen in FIGS. 3 and 4 that, for the same output torque, the ignition timing for the internal combustion engine according to the present invention can be substantially retarded compared with the ignition timing for the conventional internal combustion engine (FIG. 3) and, accordingly, in the engine of the present invention, the production of $NO_x$ can be greatly reduced (FIG. 4) without reduction of the output torque.

With the described embodiment of the invention in which a rich air-fuel mixture is not intentionally supplied to the trap chamber 12, the suction aperture 14 of the trap chamber is not necessarily disposed at the described position but may be located at another position with a similar effect provided that the part of the air-fuel mixture flowing outside the head 8a of the intake valve 8 is introduced through the suction aperture 14 into the trap chamber 12.

Figure 5:
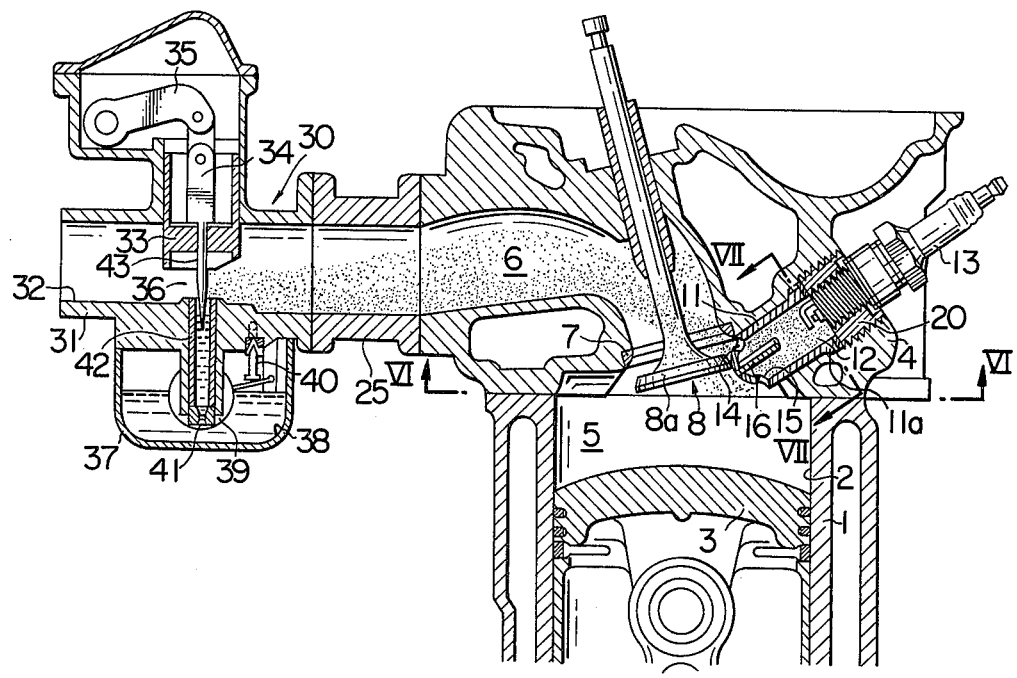
FIG. 5 is a fragmentary sectional elevation of a second embodiment of the internal combustion engine according to the present invention.
Figure 6:
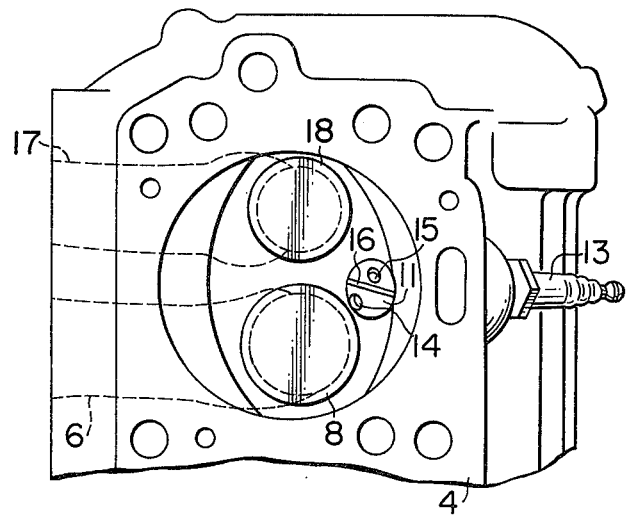
FIG. 6 is a bottom view of a cylinder head of the second embodiment of the engine taken along line VI — VI in FIG. 5.
Figure 7:
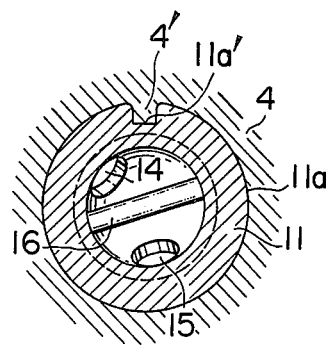
FIG. 7 is a fragmentary sectional view taken along line VII — VII in FIG. 5.

FIGS. 5, 6 and 7 illustrate a second embodiment of the present invention which is provided with only a single intake port for one cylinder but designed to locally supply a rich air-fuel mixture to a trap chamber with a particular arrangement of the intake port and a proper positional relationship between the intake port and a suction aperture for the trap chamber.

A description will be made hereunder mainly with respect to the difference between the first and second embodiments. A cylinder head 4 is formed therein with an intake port 6 having an upstream end opened in an outer surface of the cylinder head 4 and a downstream end adapted to be opened to a main combustion chamber 5 by a head 8a of an intake valve 8. The upstream portion of the intake port 6 is substantially horizontal (exactly stating, the upstream portion extends slightly gradually upwardly and inwardly of the cylinder head 4), while the downstream portion of the intake port 6 is curved downwardly. It will be seen in FIG. 6 that the intake port 6 as viewed in vertical direction is also slightly curved so that the downstream portion is directed generally toward the center of the main combustion chamber 5.

A cup-shaped member 11 defining therein a trap chamber 12 has an annular flange 11a provided along the outer peripheral edge of the cup-shaped member. The radially outer surface of the flange is connected by a downwardly converging tapered annular surface to the outer cylindrical surface of the remainder of the cup-shaped member 11. The cup-shaped member 11 is secured to the cylinder head 4 by means of a cup holder 20 with the hemisperical end portion protruding into the main combustion chamber 5 and with the tapered surface of the flange 11a being urged against the cylinder head 4. The cup holder 20 is screwed into the cylinder head 4 to urge the flange 11a of the cup-shaped member 11 against the cylinder head 4. The cylinder head 4 has thereon a projection 4' engaging with a cutout 11a' formed at a part of the periphery of the flange 11a of the cup-shaped member 11. The cutout 11a' and the projection 4' act as means for angularly positioning the cup-shaped member 11 with respect to the cylinder head 4 when the cup-shaped member 11 is mounted on the head. A spark plug 13 is screwed into the cup holder 20 so that a set of electrodes of the spark plug are disposed in the trap chamber 12.

A suction aperture 14 formed in the cup-shaped member 11 is positioned adjacent to a valve seat 7 for an intake valve 8 and is directed toward the opening of the intake port 6 to the main combustion chamber 5, while a discharge aperture 15 formed in the cup-shaped member 11 is directed toward a remote portion of the main combustion chamber. The suction and discharge apertures 14 and 15 are of the same sizes as in the first embodiment. A partition 16 in the trap chamber 12 is formed by inserting a plate-like member into a slit formed in the wall of the hemispherical end portion of the cup-shaped member 11 between the suction and discharge apertures 14 and 15 and then welding the plate-like member together with the cup-shaped member 11.

The suction aperture 14 for the trap chamber 12 is positioned with respect to the intake port 6 such that the suction aperture 14, when viewed in horizontal direction as shown in FIG. 5, is located substantially on the inward extension of the part of the inner peripheral surface of the intake port 6 extending on the radially outer side of the curved downstream portion thereof and, in addition, substantially smoothly and continuously merges with the inner peripheral surface of the valve seat 7. The position of the suction aperture 14 relative to the valve head 8a when it is in its opened position is substantially the same as in the first embodiment.

The cylinder head 4 is connected with an intake manifold 25 which is continuously joined with the upstream portion of the intake port 6 and extends substantially horizontally. The intake manifold 25 is connected at its upstream end with an AMAL carburetor 30 which is of horizontal draft type and which comprises a carburetor body 31 defining therein a horizontal air passage 32 which is smoothly joined to the intake manifold 25. A piston 33 is mounted on the upper part of the carburetor body 31 for reciprocal movement in vertical direction and projects into the air passage 32 transversely thereof. The piston 33 is operatively connected through a rod 34 and a lever 35 to an acceleration pedal (not shown) so that the piston is actuated up and down by the pedal. The bottom end of the piston 33 cooperates with the inner peripheral surface of the air passage 32 to define a venturi 36. A float bowl 37 which defines therein a float chamber 38 containing a liquid fuel therein is secured to the lower portion of the carburetor body 31. The float chamber 38 houses therein a float 39 and a needle valve 40 which operate in known manner to maintain the liquid fuel in the float chamber 38 at a substantially constant liquid level. A fuel nozzle 42 is mounted on the lower part of the carburetor body 31 and extends through the peripheral wall of this part of the carburetor body in diametrically opposed relationship with the piston 33. The fuel nozzle 42 is open at its upper end into the venturi 36. The bottom end of the fuel nozzle 42 is connected with a fuel jet 41 through which the nozzle is in communication with the float chamber 38 adjacent to the bottom thereof. A needle 43 secured at its upper end to the piston 33 has a lower end portion extending into the fuel nozzle 42 so that the needle is moved by the piston 33 to control the area of the opening of the nozzle 42 to the venturi 36.

It will be understood from the above description that the AMAL carburetor 30 has a single, main fuel-jetting port formed by the fuel nozzle 42 and is operative to produce an air-fuel mixture formed by the fuel jetted through the nozzle 42 and the air flowing through the air passage 32.

The operation of the described embodiment of the internal conbustion engine will be described hereunder. On an intake stroke, the intake valve 8 is opened and an air-fuel mixture produced by the carburetor 30 is sucked through the intake port 6 into the main combustion chamber 5 as the piston 3 is lowered. At this time, a part of the air-fuel mixture is also introduced into the trap chamber 12 because the suction aperture 14 for the trap chamber 12 is open to the intake port 6 to communicate the trap chamber therewith. The charge of the air-fuel mixture introduced into the trap chamber 12 is relatively rich while the charge of the air-fuel mixture sucked into the main combustion chamber 5 is relatively lean, although both charges have been produced by the single carburetor 30 and supplied through the single intake port 6. The reason for this will be described in detail. The liquid fuel jetted through the fuel nozzle 42 in the carburetor 30 into the venturi 36 is atomized by the air flowing through the venturi 36 and is suspended in the flowing air to initially form a uniform air-fuel mixture. However, because of the gravity of the suspended fuel and the contact of the fuel with the inner peripheral surfaces of the intake manifold 25 and the intake port 6, a substantial part of the fuel clings to the inner peripheral surfaces to form a film-like flow of fuel. As the intake manifold 25 and the upstream portion of the intake port 6 extend substantially horizontally, a substantial part of the fuel flows along the lower portions of the inner peripheral surfaces of the intake manifold 25 and the upstream portion of the intake port 6, as shown by many small spots in FIG. 5. Therefore, the part of the air-fuel mixture flowing along the lower portion of the inner peripheral surface of the upstream portion of the intake port 6 forms a stratum of rich air-fuel mixture, while the air-fuel mixture part flowing along the upper portion of the inner peripheral surface of the upstream portion of the intake port 6 forms a stratum of lean air-fuel mixture. In addition, because the AMAL carburetor 30 is of horizontal draft type, the fuel is jetted at the lower part of the air passage 32 to advantageously facilitate the separation of the strata of the rich and lean air-fuel mixture parts.

The fuel contained in the rich air-fuel mixture part which has thus flowed along the lower part of the inner peripheral surface of the upstream portion of the intake manifold 6 is then subjected to the centrifugal force due to the curvature of the downstream portion of the intake port 6. Thus, a major part of the fuel moves obliquely across the downstream portion of the intake port 6 to the part of the inner peripheral wall of the intake port 6 which is located on the radially outer side of the curved portion of the intake port, as shown by many small spots in FIG. 5. Of course, the air is also subjected to the centrifugal force at the curved portion of the intake port 6. However, because the fuel has a large specific gravity than that of air, the fuel is gathered at the radially outer side of the curved portion of the intake port to form a stratum of rich air-fuel mixture. A part of the fuel flows along the inner peripheral surface of the intake port, while another part of the fuel forms a lean air-fuel mixture.

Because the suction aperture 14 for the trap chamber 12 is located in the position described above, it will be noted that the suction aperture 14 is positioned close to the intake port 6 and on the path of flow of the stratum of the rich air-fuel mixture part, so that the latter is introduced through the suction aperture 14 into the trap chamber 12. On the other hand, the lean air-fuel mixture part is sucked into the main combustion chamber 5.

When the rich air-fuel mixture part is so introduced into the trap chamber 12, the discharge aperture 15 and the partition 16 operate in the same manner as in the first embodiment to facilitate an effective scavenging of the trap chamber.

The lean and rich air-fuel mixtures thus received in the main combustion chamber 5 and trapped in the trap chamber 12 on the intake stroke, respectively, are compressed on the compressed stroke. The rich air-fuel mixture in the trap chamber is then ignited by the spark plug 13 for the torch ignition of the lean air-fuel mixture in the main combustion chamber, whereby the rich and lean air-fuel mixtures, which are relatively lean as a whole, are perfectly burnt. It is to be noted that this can be achieved by properly positioning the suction aperture 14 for the trap chamber 12 with respect to the intake port 6.

While the described second embodiment of the invention employs the AMAL carburetor, a conventional variable venturi (SU) carburetor, which is also of the same, horizontal draft type, may be employed to provide the same functional effect. It is to be noted that a carburetor of another type may also be used to provide a substantially similar functional effect.

As the means for angularly positioning the cup-shaped member 11 with respect to the cylinder head 4 in assembling operation, the cup-shaped member may alternatively be formed with a projection at a part of the outer periphery of the flange 11a. The cylinder head 4 may be formed with a corresponding recess for engaging with the projection. Further alternatively, such a projection or the cutout 11a' may be formed at a portion of the outer periphery of the cup-shaped member 11 other than the flange 11a.

Figure 8:
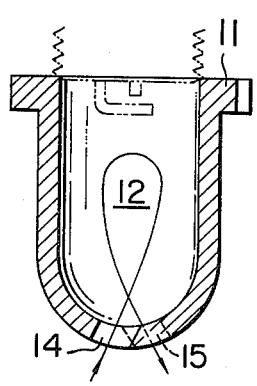
FIG. 8 is a sectional side elevation of a modified cup-shaped member used in a third embodiment of the invention.
Figure 9:
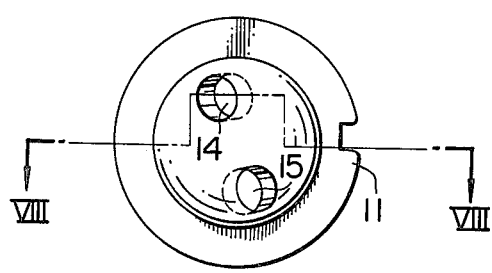
FIG. 9 is a top plan view of the cup-shaped member shown in FIG. 8.

FIGS. 8 and 9 illustrate a modified cup-shaped member which is an important part of a third embodiment of the present invention. The cup-shaped member 11 generally resembles a shot in profile as in the second embodiment and is provided with a suction aperture 14 and a discharge aperture 15 formed in the hemispherical end portion thereof. The suction and discharge apertures 14 and 15 are oriented and positioned such that an air-fuel mixture flowing through the suction aperture 14 into a trap chamber 12 describes a loop within the trap chamber and is discharged therefrom through the discharge aperture 15. The looped flow enables a fresh air-fuel mixture charge to the trap chamber to reach substantially every point therein although any special member is not provided for this purpose in the trap chamber. More specifically, the suction aperture 14 is formed in the wall of the cup-shaped member 11 at a part of the hemispherical end portion thereof and open to the tray chamber 12. The axis of the suction aperture extends upwardly obliquely with respect to the axis of the cup-shaped member 11, as will be seen in FIGS. 8 and 9. The discharge aperture 15 is formed in the hemispherical end portion of the cup-shaped member 11 and positioned in substantially diametrically opposed relationship to the suction aperture 14 with respect to the axis of the cup-shaped member 11. The discharge aperture 15 is open to the trap chamber 12 in this position and has an axis which extends similarly upwardly obliquely relative to the axis of the cup-shaped member 11. As will be seen in FIGS. 8 and 9, the suction and discharge apertures 14 and 15 are directed in substantially opposite directions.

The cup-shaped member 11 shown in FIGS. 8 and 9 is mounted on a cylinder head as in the second embodiment. The suction aperture 14 is positioned with respect to related parts in the same manner as in the first or second embodiment.

According to the arrangement of the cup-shaped member 11 of the third embodiment, an air-fuel mixture introduced through the suction aperture 14 into the trap chamber 12 flows therein along the loop-shaped path shown by broken line to the outer part of the trap chamber 12 in which electrodes of a spark plug are disposed. The air-fuel mixture flow then impinges on the spark plug and is deflected thereby and finally reaches the discharge aperture 15. Accordingly, the discharge aperture 15 is operative to discharge residual gases. Therefore, it will be noted that a fresh air-fuel mixture charge reaches every place in the trap chamber 12 and, at the same time, residual gases are discharge to effectively facilitate a reliable scavenging of the trap chamber, with a result that the third embodiment of the invention provides substantially the same functional effect and advantage as those obtainable from the first and second embodiments.

Figure 10:
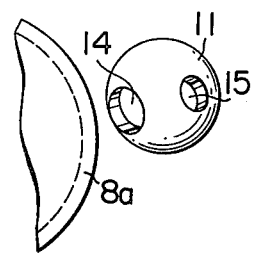
FIG. 10 illustrates in bottom view a further modified cup-shaped member.
Figure 11:
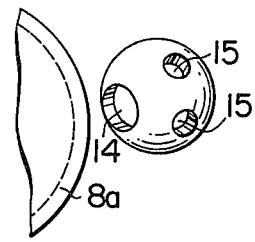
FIG. 11 is a view similar to FIG. 10 but illustrating a further modified cup-shaped member.

FIGS. 10 and 11 illustrate further modified cup-shaped members 11. The cup-shaped member 11 shown in FIG. 10 is designed to facilitate a further reliable introduction of an air-fuel mixture ino a trap chamber and, for this purpose, is provided with a suction aperture 14 having a diameter larger than that of a discharge aperture 15. The cup-shaped member 11 is provided with a pair of discharge apertures 15 each having a diameter smaller than that of a suction aperture 14. It will be apparent to those in the art that more than one suction aperture and more than two discharge apertures may of course be formed in a cup-shaped member.

What is claimed is:

1. An internal combustion engine comprising:
   a cylinder;
   a piston in said cylinder;
   a cylinder head cooperating with said cylinder and said piston to define a main combustion chamber;
   an intake valve having a valve stem and a valve head connected thereto;
   an intake port for supplying an air-fuel mixture;
   a trap chamber disposed in said cylinder head for receiving a portion of said air-fuel mixture to produce a torch jet ignition;
   said trap chamber having at least one suction aperture through which said portion of said air-fuel mixture is supplied into said trap chamber only when said intake valve is opened and said main combustion chamber is communicated with said intake port, said trap chamber also having at least one discharge aperture through which residual gas remaining in said trap chamber is discharged into said main combustion chamber;
   said suction and discharge apertures being small enough to achieve the torch jet ignition and always being in communication with said main combustion chamber during the time when said intake valve is kept closed so that the torch jet can spurt through both of said apertures; and
   a spark plug having a set of electrodes for igniting said air-fuel mixture in said trap chamber.

2. An internal combustion engine as claimed in claim 1, wherein said trap chamber comprises a separate heat-resistant member secured to said cylinder head.

3. An internal combustion engine as claimed in claim 1, wherein said intake port consists of a single passage for supplying a homogeneous air-fuel mixture.

4. An internal combustion engine as claimed in claim 1, wherein said suction aperture is positioned adjacent to said valve head of said intake valve, whereby said portion of said air-fuel mixture is effectively introduced into said trap chamber through said suction aperture.

5. An internal combustion engine as claimed in claim 1, wherein during the compression stroke the pressure at said suction and discharge apertures is substantially equal to thereby prevent a substantial portion of said air-fuel mixture received in said trap chamber from escaping therefrom.

6. An internal combustion engine as claimed in claim 5, wherein, during the compression stroke a part of the air-fuel mixture in said main combustion chamber being compressed, enters the trap chamber through said suction and discharge apertures.

7. An internal combustion engine as claimed in claim 1, wherein said trap chamber comprises a cup-shaped member of a heat-resistant metal.

8. An internal combustion engine as claimed in claim 1, wherein a diameter of said suction aperture is larger than that of said discharge aperture, to thereby facilitate the introduction of the air-fuel mixture into said trap chamber therethrough.

9. An internal combustion engine as claimed in claim 1, wherein said trap chamber comprises a further discharge aperture to thereby facilitate the production of said torch jet ignition.

10. An internal combustion engine as claimed in claim 1, wherein said suction and discharge apertures are open to said trap chamber and have axes extending at an angle with respect to each other so that a looped flow is attained in said trap chamber when the air-fuel mixture is introduced into said trap chamber.

11. An internal combustion engine as claimed in claim 1, wherein said intake port includes a curved portion and said suction aperture opens in the vicinity of the extension of the radially outer side of said curved portion, whereby the air-fuel mixture supplied along said radially outer side of said curved portion is smoothly introduced into said trap chamber through said suction aperture.

12. An internal combustion engine comprising:
   a cylinder;
   a piston in said cylinder;
   a cylinder head cooperation with said cylinder and cylinder head to define a main combustion chamber;
   an intake valve having a valve stem and a valve head connection thereto;
   an intake port for supplying a heterogeneous air-fuel mixture;
   a trap chamber, disposed in said cylinder head, having at least one suction aperture and at least one discharge aperture to produce a torch jet ignition,
   said suction aperture being so positioned as to receive in said trap chamber a portion of a richer air-fuel mixture of said heterogeneous mixture only when said intake valve is opened, said main combustion chamber is communicated with said intake port,
   said discharge aperture discharging therethrough residual gases remaining in said trap chamber into said main combustion chamber when said portion of said richer air-fuel mixture is introduced into said trap chamber,
   said suction and discharge apertures being small enough to achieve the torch jet ignition and always being in communication with said main combustion chamber during the time when said intake valve is kept closed so that the torch jet can spurt through both of said apertures; and
   a spark plug having a set of electrodes for igniting said portion of said richer air-fuel mixture in said trap chamber.

13. An internal combustion engine as claimed in claim 12 wherein said trap chamber comprises a separate heat-resistant member secured to said cylinder head.

14. An internal combustion engine as claimed in claim 12, wherein said trap chamber comprises a cup-shaped member of a heat-resistant metal.

15. An internal combustion engine as claimed in claim 12, wherein a diameter of said suction aperture is larger than that of said discharge aperture, to thereby facilitate the introduction of said portion of said richer air-fuel mixture into said trap chamber therethrough.

16. An internal combustion engine as claimed in claim 12, wherein said trap chamber comprises a further discharge aperture to thereby facilitate the production of said torch jet ignition.

17. An internal combustion engine as claimed in claim 12, wherein said suction aperture is positioned adjacent to said valve head of said intake valve, whereby said portion of said richer air-fuel mixture is effectively introduced into said trap chamber through said suction aperture.

18. An internal combustion engine as claimed in claim 12, wherein during the compression stroke the pressure at said suction and discharge apertures is substantially equal to thereby prevent a substantial portion of said richer air-fuel mixture received in said trap chamber from escaping therefrom.

19. An internal combustion engine as claimed in claim 12, wherein, during the compression stroke a part of the air-fuel mixture in said main combustion chamber, being compressed, enters the trap chamber through said suction and discharge apertures.

20. An internal combustion engine as claimed in claim 6, wherein said intake port consists of a single passage for supplying said heterogeneous air-fuel mixture.

* * * * *